(12) United States Patent  
Latronico

(10) Patent No.: US 12,304,156 B2
(45) Date of Patent: May 20, 2025

(54) WELDING DEVICE FOR MAKING AND HERMETICALLY SEALING AT LEAST ONE PACKAGE CONTAINING A PRODUCT

(71) Applicant: BG PACK S.r.l., Treviolo (IT)

(72) Inventor: Mario Latronico, Treviolo (IT)

(73) Assignee: BG PACK S.r.l., Treviolo (IT)

( * ) Notice: Subject to any disclaimer, the term of this patent is extended or adjusted under 35 U.S.C. 154(b) by 151 days.

(21) Appl. No.: 17/786,453

(22) PCT Filed: Dec. 16, 2020

(86) PCT No.: PCT/IB2020/062055
§ 371 (c)(1),
(2) Date: Jun. 16, 2022

(87) PCT Pub. No.: WO2021/140387
PCT Pub. Date: Jul. 15, 2021

(65) Prior Publication Data
US 2024/0025130 A1    Jan. 25, 2024

(30) Foreign Application Priority Data
Jan. 8, 2020   (IT) .......................... 102020000000151

(51) Int. Cl.
*B65B 9/10* (2006.01)
*B29C 65/00* (2006.01)
(Continued)

(52) U.S. Cl.
CPC ........ *B29C 66/8491* (2013.01); *B29C 65/743* (2013.01); *B29C 66/43121* (2013.01);
(Continued)

(58) Field of Classification Search
CPC ......... B65B 61/06; B65B 59/00; B65B 51/26; B65B 43/08; B65B 41/12; B65B 9/10;
(Continued)

(56) References Cited

U.S. PATENT DOCUMENTS 3,943,683 A * 3/1976 Kovacs ................... B65B 51/30
53/550
4,305,240 A   12/1981 Grevich et al.

FOREIGN PATENT DOCUMENTS

WO   2008107917 A1   9/2008

* cited by examiner

*Primary Examiner* — Robert F Long
*Assistant Examiner* — Mary C Hibbert-Copeland
(74) *Attorney, Agent, or Firm* — Seyfarth Shaw LLP

(57) ABSTRACT

A welding device for making and hermetically sealing at least one package containing a product, comprises first and second sealing and cutting equipment. Each sealing equipment is configured to receive a film forming a tubular envelope, to seal and cut it transversally for making at least one package. The welding device comprises a support body, bearing the first and the second sealing and cutting equipment, which is connectable to a packaging machine preferably a rotary drum of a packaging machine. Each sealing and cutting equipment comprises an arm operating as a sealing and cutting head and an abutment body. The arm is rotatably constrained to the support body and reversibly movable between an active position substantially abutting the abutment body, and an inactive position raised with respect to the abutment body. A locking device locks the arms in the active position in the welding step.

12 Claims, 3 Drawing Sheets

(51) Int. Cl.
*B29C 65/74* (2006.01)
*B65B 41/12* (2006.01)
*B65B 43/08* (2006.01)
*B65B 51/26* (2006.01)
*B65B 59/00* (2006.01)
*B65B 61/06* (2006.01)

(52) U.S. Cl.
CPC ............ *B29C 66/8324* (2013.01); *B65B 9/10* (2013.01); *B65B 41/12* (2013.01); *B65B 43/08* (2013.01); *B65B 51/26* (2013.01); *B65B 59/00* (2013.01); *B65B 61/06* (2013.01)

(58) Field of Classification Search
CPC .......... B29C 66/43121; B29C 66/8324; B29C 65/743; B29C 66/8491
USPC ......................................................... 53/547
See application file for complete search history.

WELDING DEVICE FOR MAKING AND HERMETICALLY SEALING AT LEAST ONE PACKAGE CONTAINING A PRODUCT

The present invention relates to a welding device for making and hermetically sealing at least one package containing a product and a packaging machine.

In particular, the present invention can be applied in the industrial sector of packaging machines for the packaging of products of various kinds, purely by way of non-limiting example food products. In particular, the present invention can be applied in the industrial sector of high speed horizontal packaging machines.

Packaging machines are configured to receive a synthetic film, preferably polyethylene based, for wrapping it to form a tubular envelope inside which a longitudinal sequence of products is found, and subsequently for making one packet at a time, transversally cutting the tubular envelope between two consecutive products and hermetically sealing it by welding.

In detail, the synthetic film unwound from a reel supportingly receives a succession of products to be supplied to a welding unit and is folded over and welded to make the tubular envelope. The welding unit is configured to make the packets by transversally cutting the tubular envelope and sealing the product inside it by welding. In particular, a welding jaw is activated on an intermediate portion of the tubular envelope between two subsequent products so as to make a packet by dividing it from the following portion of the tubular envelope. The welding jaw creates the heat sealing of the film at the end of the packet so as to seal the product inside it. The packets made are then arranged in a temporary storage unit and then sorted with the other production process steps.

In known packaging machines, the jaws are arranged on the lateral surface of a rotary drum so as to define a welding and cutting surface substantially parallel to the axis of rotation of the drum and, preferably, perpendicular to the feeding direction of the tubular envelope.

Each welding jaw has an abutment surface that can be selectively constrained to the rotary drum to be drawn in rotation by the rotary drum itself in a gripping and welding step of the tubular envelope. In a waiting step, the welding jaws are constrained by the rotary drum and accumulate at a stopping member.

Each welding jaw further has an arm rotatably constrained to the abutment surface and movable between an active position, in which it substantially abuts on the abutment surface and interferes with the tubular envelope to make the package, and an inactive position in which it does not interfere with the tubular envelope. An example of a packaging machine of this type is for example described in WO2008/107917 and in EP1413521.

Disadvantageously, the quantity of packages that can be made in the time unit is limited by the movement speed of the arms of the jaw.

Some of the most recently built packaging machines supply to the jaws two tubular envelopes parallel to one another, generally having reduced dimensions, so as to make two packages by means of a single movement of the arm itself, which has larger dimensions with respect to the arms of previously designed machines.

However, disadvantageously, the inertia induced by the aforementioned arms induces strong vibrations that have a negative effect on the operating life of the packaging machine.

Furthermore, very disadvantageously, defects can be generated in particular in the weld performed on the packages of the succession that is in the distal position with respect to the hinge that connects the arm to the abutment surface. In fact, if the envelope arranged in the proximal position to the hinging point of the arm has larger thicknesses, for example due to the incorrect arrangement of the longitudinal weld, it is not possible to correctly close the arm onto the abutment element and therefore the welding is incomplete.

In this context, the technical task underpinning the present invention is that of providing a welding device for making and hermetically sealing at least one package containing a product and a packaging machine free from the aforementioned drawbacks.

In particular, it is an object of the present invention to provide a welding device and a packaging machine able to increase the efficacy of the seals on the packages.

A further object of the present invention is to provide a welding device and a packaging machine able to increase the production rate of the packaging operations, having high functional flexibility and an increased operating life with respect to devices and machines of the prior art.

These and other objects are substantially achieved by a welding device for making and hermetically sealing at least one package containing a product and a packaging machine according to what is described in one or more of the attached claims.

The dependent claims herein incorporated for reference purposes correspond to further embodiments according to the present invention. Further characteristics and advantages of the present invention will become clearer from the detailed description of a preferred and not exclusive embodiment of a welding device for making and hermetically sealing at least one package containing a product and a packaging machine according to the invention.

The description is provided with reference to the accompanying figures, which are likewise provided by way of illustrative and thus non-limiting example, in which.

Figure 3:
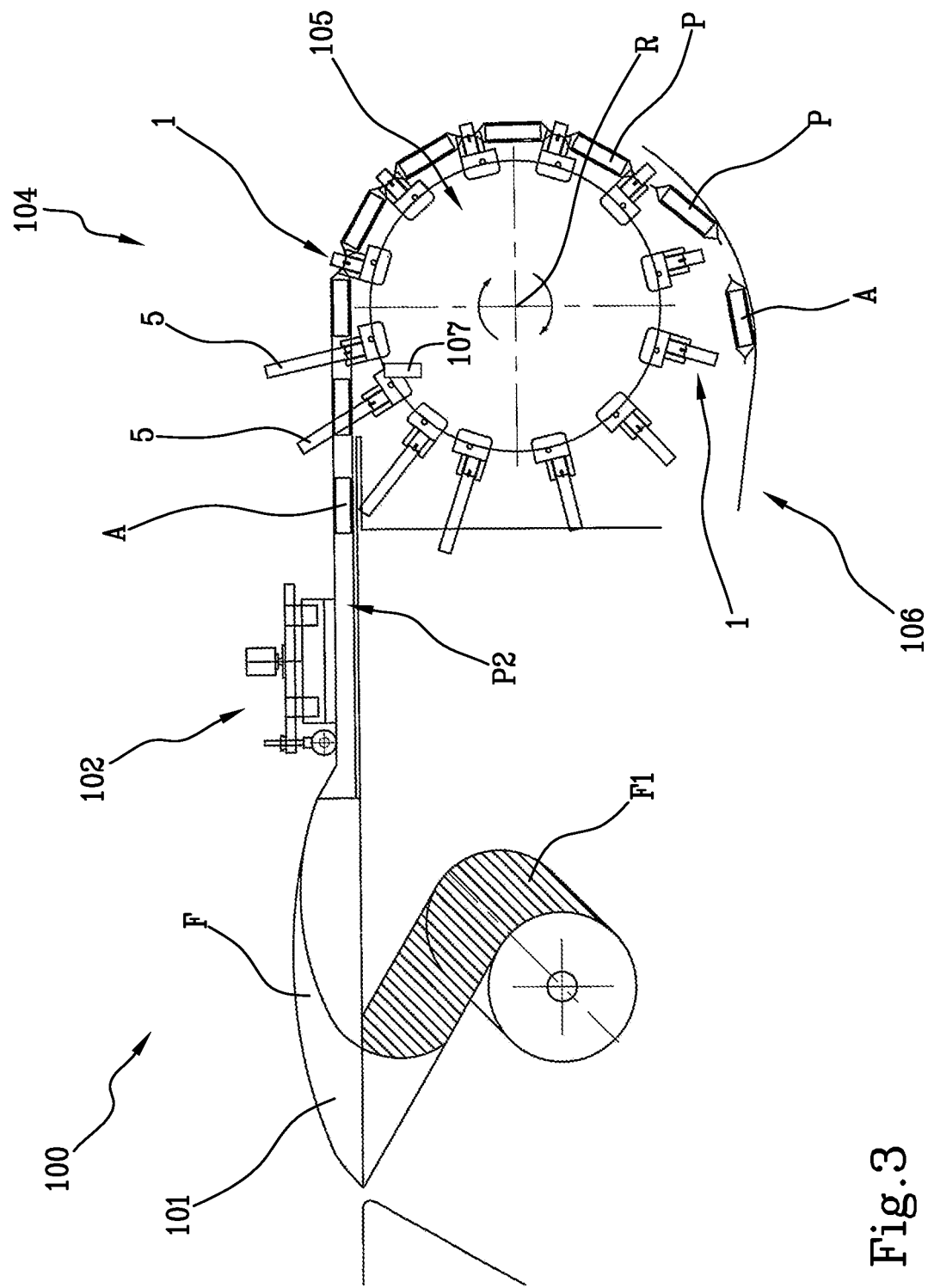
FIG. 3 is a schematic view of a packaging machine according to a further aspect of the present invention.

With reference to FIG. 3, 100 indicates a packaging machine, in particular a packaging machine of the flow pack type for making hermetically sealed packages.

The packaging machine 100 comprises a supply means 101 for supplying at least one film "F" coming from a reel F1. The film "F" slides longitudinally along the packaging machine 1 according to a supply direction "X".

Furthermore, the packaging machine 100 comprises at least one forming unit 102 adapted to form the film "F" so as to make a tubular envelope F2. The forming unit 102 is particularly adapted to weld the longitudinal edges of the film "F" to one another placed alongside one another to form the tubular envelope F2.

Preferably, two films "F" are obtained from a single reel F1, operating a central longitudinal cut a using cutting means, not illustrated, arranged downstream of the reel F1 according to the supply direction "X". In this case, two forming units 102 are provided for forming two tubular envelopes F2 starting from the two films "F". Alternatively, two reels F1 can be provided, each intended to make a film "F" and a corresponding tubular envelope F2. The two tubular envelopes F2 proceed parallel along the packaging machine 100.

Advantageously, the packaging machine 100 comprises a supply means for supplying the product, not illustrated, and configured to supply a succession of products "A" towards the film "F" so that, downstream of the forming unit(s) 102 according to the supply direction "X", the products "A" are arranged inside the tubular envelope F2 and distanced from one another along the longitudinal direction. Preferably, the product supply means comprises a belt conveyor.

Furthermore, the packaging machine 100 comprises at least one packaging unit 104 adapted to make at least one package "P" containing a product "A".

The packaging unit 104 comprises a motorised rotary drum 105, positioned downstream of the forming unit(s) 102. The rotary drum 105 is arranged so as to rotate about a horizontal axis of rotation "R", arranged transversal, preferably perpendicular, to the supply direction "X" of the film "F".

The rotary drum 105 is configured to pull the tubular envelope(s) F2 along the supply direction "X" and to direct it/them towards a collection unit 106. The collection unit 106, arranged downstream of the rotary drum 105 according to the supply direction "X", is configured to receive the packages "P".

According to a possible embodiment and as for example illustrated in FIG. 3, the packaging unit 104 comprises a plurality of welding devices 1 associated with the rotary drum 105 and arranged circumferentially along the outer surface of the rotary drum 105.

Each welding device can be selectively constrained to the rotary drum 105 to be drawn in rotation by the rotary drum itself in a step for gripping and welding the tubular envelope F2. In a waiting step, the welding devices 1 are unconstrained in rotation from the rotary drum 105 and accumulate at a stopping member 107 that is movable between a first position in which it retains the welding devices 1 in the waiting step and a second position in which it enables the passage of one welding device 1 at a time. In the waiting step, the welding devices 1 have the possibility to slide with respect to the rotary drum 105, generally placed in rotation with a substantially constant speed.

The number of welding devices 1 and therefore their positioning along the rotary drum 105 can vary as a function of the dimensions of the product "A". In particular, the welding devices 1 can be mounted and remounted on the rotary drum 105 as a function of the type of product to be packaged.

The packaging machine 100 can comprise a control unit (not illustrated in the appended figures) configured to control a plurality of operating parameters of the packaging machine 100.

Figure 1:
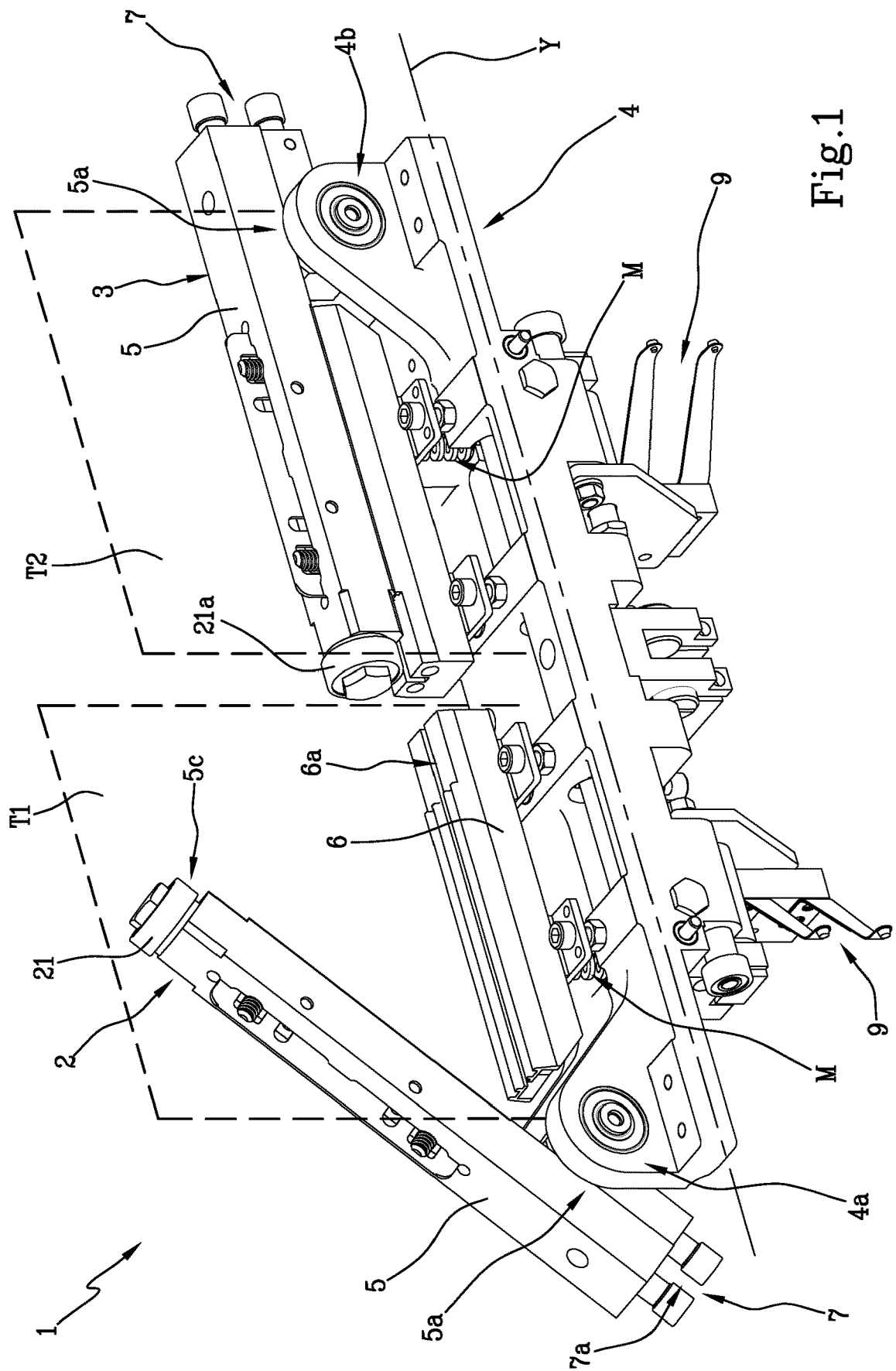
FIG. 1 is a perspective view of a welding device for making and hermetically sealing at least one package containing a product according to a possible embodiment of the present invention.
Figure 2:
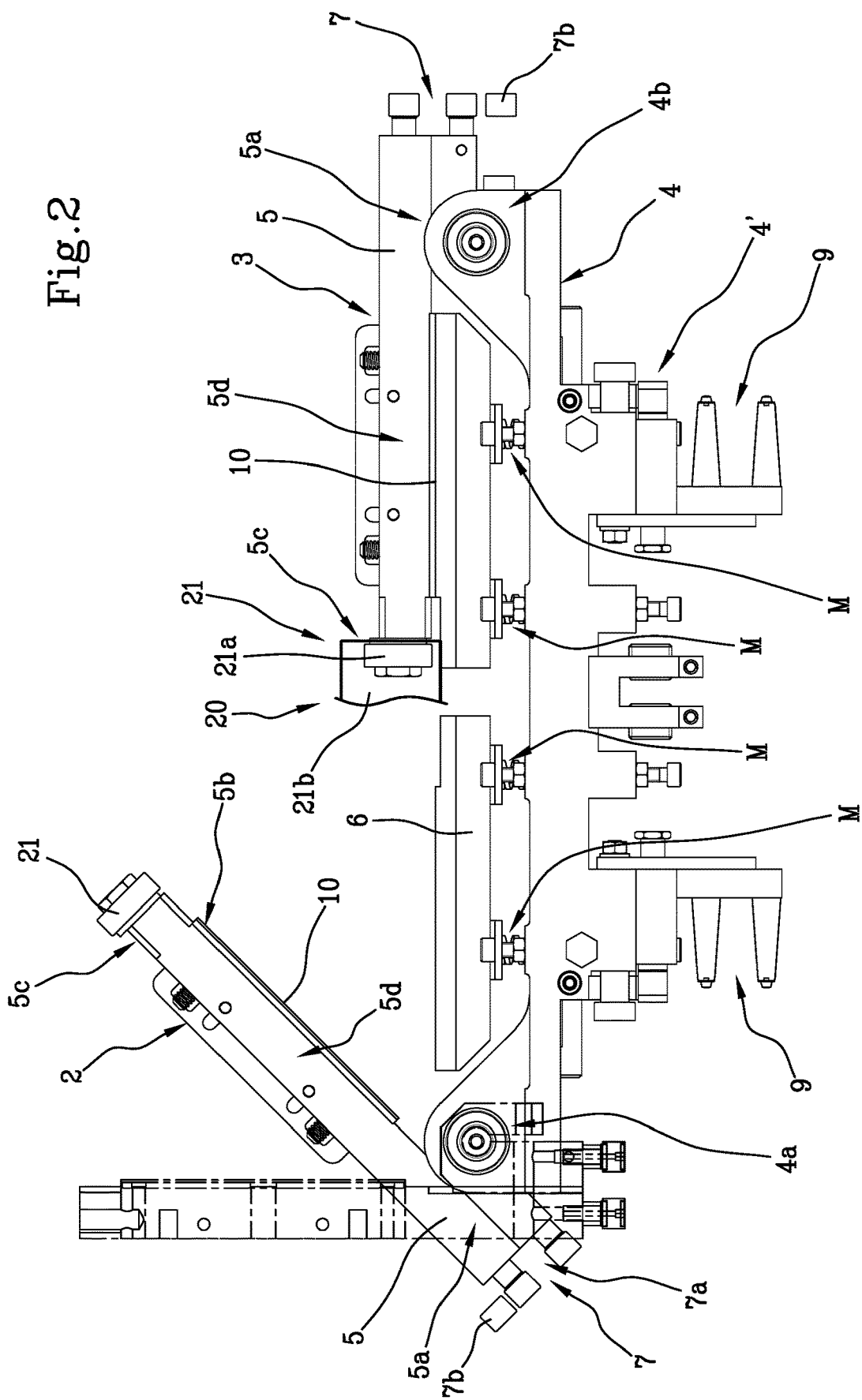
FIG. 2 is a front view of a welding device of FIG. 1 and some schematic aspects of the packaging machine 100.

With reference to FIGS. 1 and 2, one of the welding devices 1 has been illustrated.

The welding device 1 comprises a first and a second sealing and cutting equipment 2, 3 each adapted to receive a respective tubular envelope F2 for making at least one package "P".

As for example illustrated in FIGS. 1-2, the welding device 1 comprises a support body 4 bearing the first and the second sealing and cutting equipment 2, 3. Both the support body 4 and the sealing and cutting equipment 2, 3 extend mainly along a direction "Y" that corresponds to the extension of the welding and cutting line that is generated in the tubular envelope F2. Preferably, the first and the second sealing and cutting equipment 2, 3 are arranged in axially opposite positions of the welding device 1 with respect to the direction "Y".

The first and the second sealing and cutting equipment 2, 3 are arranged aligned with one another along the direction "Y" and are overall parallel to the support body. In other words, along the direction "Y", the support body 4 has a double length with respect to the length of each sealing and cutting equipment 2, 3 so as to house both of them.

The support body 4 can be connected to the rotary drum 105 of a packaging machine. 4' indicates known members, which are therefore not described in detail, adapted to connect the support body 4 to the rotary drum 105 and configured so as to constrain it selectively to the rotary drum 105 itself for performing the gripping and welding step and the waiting step previously described.

In other words, through the support body 4 it is possible to simultaneously connect the first and the second sealing and cutting equipment 2, 3 to the rotary drum 105 of a packaging machine.

When the welding device 1 is associated with the rotary drum 105 of a packaging machine, the first and the second sealing and cutting equipment 2, 3 are arranged parallel to the axis of rotation "R" of the rotary drum itself, i.e. they are arranged so as to generate a welding line and a cutting line parallel to the axis of rotation "R" of the rotary drum 105. The welding line and the cutting line are transversal, preferably perpendicular, to the supply direction "X".

Advantageously, the welding device 1 can comprise an adjustment means (not illustrated in the appended figures) adapted to adjust a mutual positioning between the first and the second sealing and cutting equipment 2, 3. Preferably, the first and the second sealing and cutting equipment 2, 3 are mutually movable towards and/or away from one another along the direction "Y" i.e. along a transversal, preferably perpendicular, direction to the supply direction "X" of the film "F".

Furthermore, the adjustment means can enable a movement along a direction parallel to the supply direction "X" and/or a mutual rotation of the sealing and cutting equipment 2, 3 without altering the inventive concept underlying the present invention.

Each sealing and cutting equipment 2, 3 comprises an arm 5 and an abutment body 6.

As illustrated in the figures, the arm 5 may be rotatably constrained to the support body 4. In particular, the support body 4 defines a first and a second constraining portion 4a, 4b each of which is adapted to define a rotatable coupling with a respective constraining end 5a of an arm 5. In other words, each of the arms 5 has a constraining end 5a hinged to a respective constraining portion 4a, 4b.

The constraining portions are aligned along the direction "Y" and preferably arranged in axially external positions of the welding device 1 along the axis of rotation "R" of the rotary drum. In other words, the abutment bodies 6 are preferably interposed between the constraining portions 4a, 4b.

According to further possible embodiments not illustrated in the appended figures, the arm 5 may be hinged to the abutment body 6 and/or the abutment bodies 6 may be made solidly as a single part with the support body 4 without altering the inventive concept underpinning the present invention.

The welding device 1 can further comprise at least one portion of movement means 7 adapted to move the arms 5.

According to a possible embodiment of the present invention and as illustrated in the appended figures, the movement means 7 comprises cam means comprising sliders 7a arranged in proximity to the constraining end of each arm 5. The sliders 7a are intended to cooperate with shaped profiles 7b solidly constrained to a frame of the packaging machine 100 for making an opening and/or closing movement of the arm 5 with respect to the respective abutment body 6 and support body 4.

In particular, the cam means (of the known type and therefore not described in detail) is configured so that the arm 5 can be moved reversibly in a plurality of positions comprised between an active (or closed) position and an inactive (or open) position.

In the active position, the arm 5 is substantially in abutment on the abutment body 6 and interferes with the supply direction "X" of the film "F" for making a package. In the inactive position, the arm 5 is raised with respect to the abutment body 6 and does not interfere with the supply direction "X" of the film "F".

The arm 5 has an abutment portion 5b adapted to abut against the abutment body 6 to engage a part of the tubular envelope F2 in the active position of the arm 5.

Advantageously, the abutment portion 5b may be substantially counter-shaped to the abutment body 6 defining a highly efficient coupling for the sealing and cutting operations.

Preferably, the abutment bodies 6 are mounted on the support body 4 by means of elastic elements, preferably springs "M".

The packaging device 1 further comprises at least one portion of locking means 20 adapted to lock the arms 5 in the active position for making the package.

As illustrated schematically in FIG. 2, the locking means 20 is preferably arranged between the first and the second sealing and cutting equipment 2, 3.

In particular, the locking means 20 can comprise a further cam means 21 operating at a locking end 5c of each arm 5, opposite the aforesaid constraining end 5a, when the latter is in the active position.

Preferably, the constraining ends 5a are arranged in axially external positions of the welding device 1 and the locking ends 5c are arranged in an axially internal position and facing one another. Preferably, the arm 5 can have a slider 21a arranged at the locking end 5c to cooperate with a shaped profile 21b arranged centrally with respect to the welding device 1, i.e. arranged between the first and the second sealing and cutting equipment 2, 3. The shaped profile 21b is solidly constrained to a frame of the packaging machine 100 and is configured to maintain the active position of both the arms 5 during welding.

In other words, the arms are arranged aligned and counter rotating, with the free ends arranged centrally with respect to the support body. In this way, it is possible to particularly effectively distribute the mechanical strain on the structure of the packaging machine.

The abutment portions 5b and/or the abutment bodies 6 comprise heatable plates for creating the welding on the engaged part of the tubular envelope F2. As illustrated in the appended figures, the welding device 1 comprises an electric supply means 9 of the known type configured to bring electric power to the plates for welding the tubular envelope F2.

As illustrated in the appended figures, each sealing and cutting equipment 2, 3 comprises at least one cutting blade 10 adapted to separate a packaging portion from the envelope F2 for making a package "P" containing a product.

Preferably, each arm 5 creates a welding and cutting head cooperating with the abutment body 6. According to a possible alternative embodiment of the present invention, the arm 5 defines a housing 5d adapted to house the cutting blade 10 at least partially. In particular, the cutting blade 10 can be reversibly mounted between an inactive position in which it is arranged within the housing 5d and an active position in which it projects from the abutment portion 5b of the arm 5.

Preferably, the abutment body 6 has an opening 6a adapted to receive in insertion the cutting blade 10 in the active condition of the cutting blade 10.

In this way, the first and the second sealing and cutting equipment 2, 3 define a first and a second cutting plane "T1", "T2", respectively. The first and the second cutting plane "T1", "T2" are transversal, preferably perpendicular, to the supply direction "X" of the envelope F2. Furthermore, the first and the second cutting plane "T1", "T2" are substantially parallel and, preferably, coinciding.

Preferably, furthermore, the first and the second cutting plane "T1", "T2" are parallel to the movement direction of the cutting blades 10.

In use, the control unit handles a plurality of operating parameters including the rotation speed of the rotary drum 105. Operating on two tubular envelopes F2 simultaneously, the packaging machine 100 is able to operate up to 18,000 packages/hour.

In the step of arrangement of the packaging machine 100, welding devices 1 are mounted on the rotary drum 105, the number of which is selected as a function of the dimensions of the product.

Once the packaging machine has been arranged, during normal operation two tubular envelopes F2 are supplied parallel towards the packaging unit 104, preferably starting from a single film "F" divided into two longitudinal portions, each forming a tubular envelope F2.

While the rotary drum 105 is placed in rotation at a substantially constant speed, a part of the welding devices 1 is retained in a waiting step by the stopping member 107 which releases one of them at a time cyclically. When a welding device 1 is released by the stopping member 107, the members 4' connect the support body 4 to the rotary drum 105, constraining them in rotation according to a known way.

To perform the gripping and welding step, each arm 5 is closed onto the respective abutment body 6 by means of the movement means 7 and is maintained in an active position by means of a locking means 20 which is partially in common between the two arms 5.

In this step, the tubular envelope F2 is welded and cut to form a package "P" subsequently collected in the collection unit 106.

It is therefore observed that the present invention achieves the proposed aims by creating a welding device able to increase the efficacy of the seals on the packages thanks to the presence of a first and second sealing and cutting equipment, respectively adapted to receive a tubular envelope, borne by the support body 4 itself.

Advantageously, the use of a pair of sealing and cutting equipment reduces the mechanical strain induced in the operating steps on the packaging machine.

In particular, the use of two arms of reduced dimensions with respect to solutions of the prior art (having a single arm with larger dimensions and adapted to intercept two tubular envelopes) reduces the inertia during the operating steps and the moments induced on the packaging machine by the welding device.

In particular, the aligned and, substantially, counter-rotating arrangement of the arms more effectively distributes the mechanical strain on the structure of the packaging machine.

In this way, the welding device contributes to increasing the operating life of the packaging machine.

Furthermore, the first and second sealing and cutting equipment borne by the support body itself enables the production rate to be increased with respect to solutions that only have one sealing and cutting equipments.

The multiple adjustment possibilities provide the welding device and the packaging machine with high functional flexibility.

The invention claimed is:

1. A welding device for a packaging machine for simultaneously making and sealing two packages, each package being configured for containing a product, the welding device comprising:

first sealing and cutting equipment, the first sealing and cutting equipment configured to receive a first tubular envelope and to seal the first tubular envelope transversally, the first sealing and cutting equipment comprising a first cutting blade adapted to separate a portion of the first tubular envelope for making a first package, of the two packages, containing a first product, the two packages being formed from the first tubular envelope and a second tubular envelope, the first tubular envelope and the second tubular envelope being parallel to each other and configured to advance in a same direction in the packaging machine;

second sealing and cutting equipment, the second sealing and cutting equipment configured to receive the second tubular envelope and to seal the second tubular envelope transversally, the second sealing and cutting equipment comprising a second cutting blade adapted to separate a portion of the second tubular envelope for making a second package, of the two packages, containing a second product, a support body bearing both the first sealing and cutting equipment and the second sealing and cutting equipment, whereby the first sealing and cutting equipment and the second sealing and cutting equipment are aligned to each other and arranged in opposite positions along an extension direction (Y) of the support body, the support body being connectible to a packaging machine;

wherein both the first sealing and cutting equipment and the second sealing and cutting equipment respectively comprise an arm and an abutment body, the arm being rotatably constrained with respect to the support body and reversibly movable between an active position wherein the arm is substantially abutting the abutment body, and an inactive position in which the arm is raised with respect to the abutment body; and wherein each arm comprises a portion of a common locking mechanism fixed on the support body in a central position between both arms, the locking mechanism being adapted to simultaneously lock both arms in the active position.

2. The welding device of claim 1, wherein the first sealing and cutting equipment and the second sealing and cutting equipment define a first and a second cutting plane, respectively, and wherein the first and second cutting planes are substantially parallel and, coinciding.

3. The welding device of claim 1, wherein said support body defines a first and a second constraining portion, each of the arms having a constraining end hinged to a respective constraining portion.

4. The welding device of claim 3, wherein the abutment bodies are essentially interposed with said first and second constraining portions arranged in axially external positions along the extension direction (Y).

5. The welding device according to claim 1, further comprising a portion of a movement device adapted to move the arms, the movement device comprising cam elements comprising sliders arranged in proximity to a constraining end of each arm and configured to cooperate with shaped profiles solidly constrained to a frame of the packaging machine for making a movement of the arm with respect to the abutment body.

6. The welding device of claim 5, wherein the locking ends are arranged in an axially internal position and facing one another, and the constraining ends are arranged in axially external positions of the sealing device along the extension direction (Y).

7. The welding device of claim 6, wherein each arm has a slider arranged at the locking end, both sliders being adapted to cooperate with a single shaped profile of the packaging machine.

8. The welding device according to claim 1, wherein said locking mechanism comprises a further cam element having a slider arranged at a locking end of each arm, opposite to a constraining end, wherein the slider is adapted to cooperate with a shaped profile of the packaging machine.

9. A packaging machine, comprising:

a supply device that supplies at least one film along a given direction;

at least one forming unit adapted to form the film so as to make two tubular envelopes advancing parallel to each other along the given direction;

a supply unit for supplying a product and configured to supply a succession of products so that the products are arranged inside the tubular envelopes; and a packaging unit comprising a rotary drum and a plurality of welding devices, wherein each welding device comprises:

first sealing and cutting equipment, the first sealing and cutting equipment configured to receive a first tubular envelope and to seal the first tubular envelope transversally, the first sealing and cutting equipment comprising a first cutting blade adapted to separate a portion of the first tubular envelope for making a first package containing a first product; and second sealing and cutting equipment, the second sealing and cutting equipment configured to receive a second tubular envelope and to seal the second tubular envelope transversally, the second sealing and cutting equipment comprising a second cutting blade adapted to separate a portion of the second tubular envelope for making a second package containing a second product;

a support body bearing both the first sealing and cutting equipment and the second sealing and cutting equipment, whereby the first sealing and cutting equipment and the second sealing and cutting equipment are aligned to each other and arranged in opposite positions along an extension direction of said support body, the support body being connected to a rotary drum of a packaging machine;

wherein both the first sealing and cutting equipment and the second sealing and cutting equipment respectively comprise an arm and an abutment body, the arm being rotatably constrained with respect to the support body and reversibly movable between an active position in which the arm is substantially abutting the abutment body, and an inactive position in which the arm is raised with respect to the abutment body; and wherein each arm comprises a portion of a common locking mechanism fixed on the support body in a central position between both arms, the locking mechanism being adapted to simultaneously lock both arms in the active position, and-wherein the welding devices are associated with the rotary drum, the rotary drum being rotatable about a transverse horizontal axis of rotation, perpendicular to the supply direction of the film.

10. The packaging machine of claim 9, further comprising a movement device adapted to move the arms between the active position and the inactive position, wherein the movement device comprises cam elements comprising sliders arranged in proximity to the constraining end of each arm and cooperating with shaped profiles solidly constrained to a frame of the packaging machine for making a predetermined movement of the arm with respect to the respective abutment body and the support body.

11. The packaging machine of claim 9, further comprising a further cam element operating at a locking end of each arm, opposite to a constraining end, wherein the constraining ends are arranged in axially external positions of the welding device and the locking ends are arranged in axially internal positions and facing one another.

12. The packaging machine of claim 11, wherein each arm has a slider arranged at the locking end and both sliders are arranged so as to cooperate with a single shaped profile arranged centrally with respect to the welding device between the first and the second sealing and cutting equipment.

* * * * *